US012423857B2

(12) United States Patent
Green et al.

(10) Patent No.: US 12,423,857 B2
(45) Date of Patent: Sep. 23, 2025

(54) METHOD FOR DEBUGGING IMAGES AND TRACKING USAGE PATTERNS OF ANONYMOUS OBJECTS WITHIN A SPACE

(71) Applicant: VergeSense, Inc., Mountain View, CA (US)

(72) Inventors: Kelby Green, Mountain View, CA (US); Habib Bukhari, Mountain View, CA (US)

(73) Assignee: VergeSense, Inc., Mountain View, CA (US)

( * ) Notice: Subject to any disclaimer, the term of this patent is extended or adjusted under 35 U.S.C. 154(b) by 103 days.

(21) Appl. No.: 18/542,438

(22) Filed: Dec. 15, 2023

(65) Prior Publication Data

US 2024/0135575 A1 Apr. 25, 2024

Related U.S. Application Data

(63) Continuation of application No. 18/230,537, filed on Aug. 4, 2023, now Pat. No. 11,887,328.
(Continued)

(51) Int. Cl.
*G06T 7/70* (2017.01)
*G06T 7/20* (2017.01)
(Continued)

(52) U.S. Cl.
CPC .................. *G06T 7/70* (2017.01); *G06T 7/20* (2013.01); *G06T 7/90* (2017.01); *G06V 10/25* (2022.01);
(Continued)

(58) Field of Classification Search
CPC .... G06T 7/70; G06T 7/20; G06T 7/90; G06T 2207/10024; G06T 2207/30196;
(Continued)

(56) References Cited

U.S. PATENT DOCUMENTS

2013/0070967 A1* 3/2013 Genc ........................ G06T 7/20
382/103
2016/0358341 A1* 12/2016 Li ............................. G06T 7/13

FOREIGN PATENT DOCUMENTS

CA 3 105 078 * 1/2020
WO WO 2021/102030 * 5/2021

* cited by examiner

*Primary Examiner* — Qian Yang
(74) *Attorney, Agent, or Firm* — Run8 Patent Group, LLC; Peter Miller

(57) ABSTRACT

One variation of a method includes, at a sensor block: detecting a set of objects within a region-of-interest in a frame; detecting an object type of each object; detecting a location of each object within the region-of-interest; and storing object types and object locations of the set of objects in a set of containers. The method further includes, at the computer system: accessing a database of commissioning images; extracting a commissioning image annotated with boundaries from the database; initializing a visualization layer of a set of pixels representing the region-of-interest; and calculating a frequency of presence of the object type intersecting each pixel based on the set of containers; calculating a color value for each pixel based on the frequency of presence; and assigning the color value to each pixel in the visualization layer; and generating a heatmap of the region-of-interest based on the visualization layer and the commissioning image.

20 Claims, 5 Drawing Sheets

Related U.S. Application Data

(60) Provisional application No. 63/395,180, filed on Aug. 4, 2022.

(51) Int. Cl.
  *G06T 7/90* (2017.01)
  *G06V 10/25* (2022.01)
  *G06V 10/56* (2022.01)
  *G06V 10/762* (2022.01)

(52) U.S. Cl.
  CPC ............ *G06V 10/56* (2022.01); *G06V 10/762* (2022.01); *G06T 2207/10024* (2013.01); *G06T 2207/30196* (2013.01); *G06V 2201/07* (2022.01)

(58) Field of Classification Search
  CPC ...... G06V 10/25; G06V 10/56; G06V 10/762; G06V 2201/07; G06V 10/62; G06V 10/50; G06V 20/52
  See application file for complete search history.

METHOD FOR DEBUGGING IMAGES AND TRACKING USAGE PATTERNS OF ANONYMOUS OBJECTS WITHIN A SPACE

CROSS-REFERENCE TO RELATED APPLICATIONS

This Application is a continuation application of U.S. patent application Ser. No. 18/230,537, filed on 4 Aug. 2023, which claims the benefit of U.S. Provisional Application No. 63/395,180, filed on 4 Aug. 2022, each of which is incorporated in its entirety by this reference.

This Application is related to U.S. patent application Ser. No. 17/751,494, filed on 23 May 2022, U.S. patent application Ser. No. 17/979,646, filed on 2 Nov. 2022, and U.S. patent application Ser. No. 18/134,490, filed on 13 Apr. 2023, each of which is incorporated in its entirety by this reference.

TECHNICAL FIELD

This invention relates generally to the field of workplace monitoring and more specifically to a new and useful method for debugging images and tracking usage patterns of anonymous objects within a space in the field of workplace monitoring.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
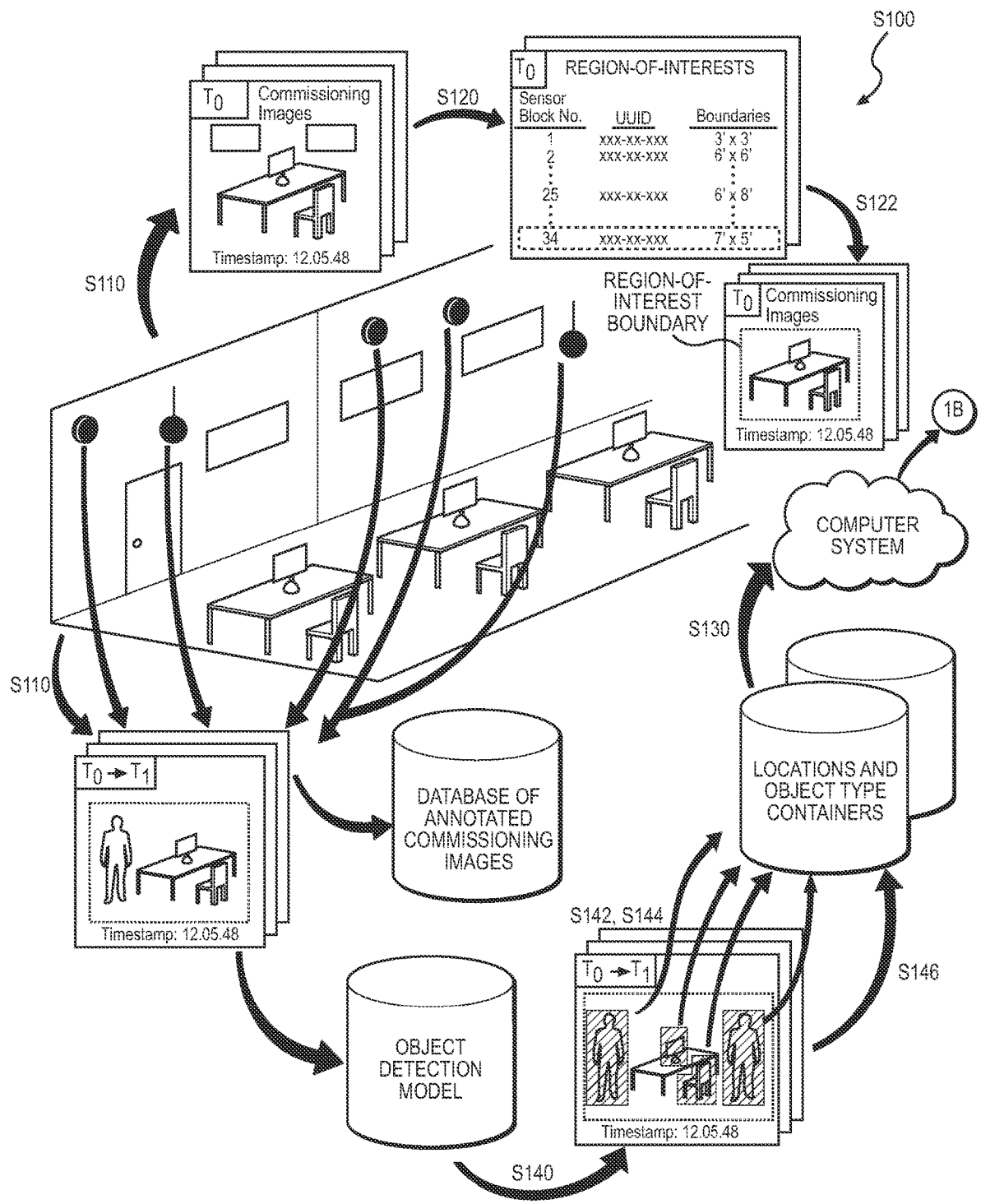
FIGS. 1A and 1B are a flowchart representation of a method.
Figure 1B:
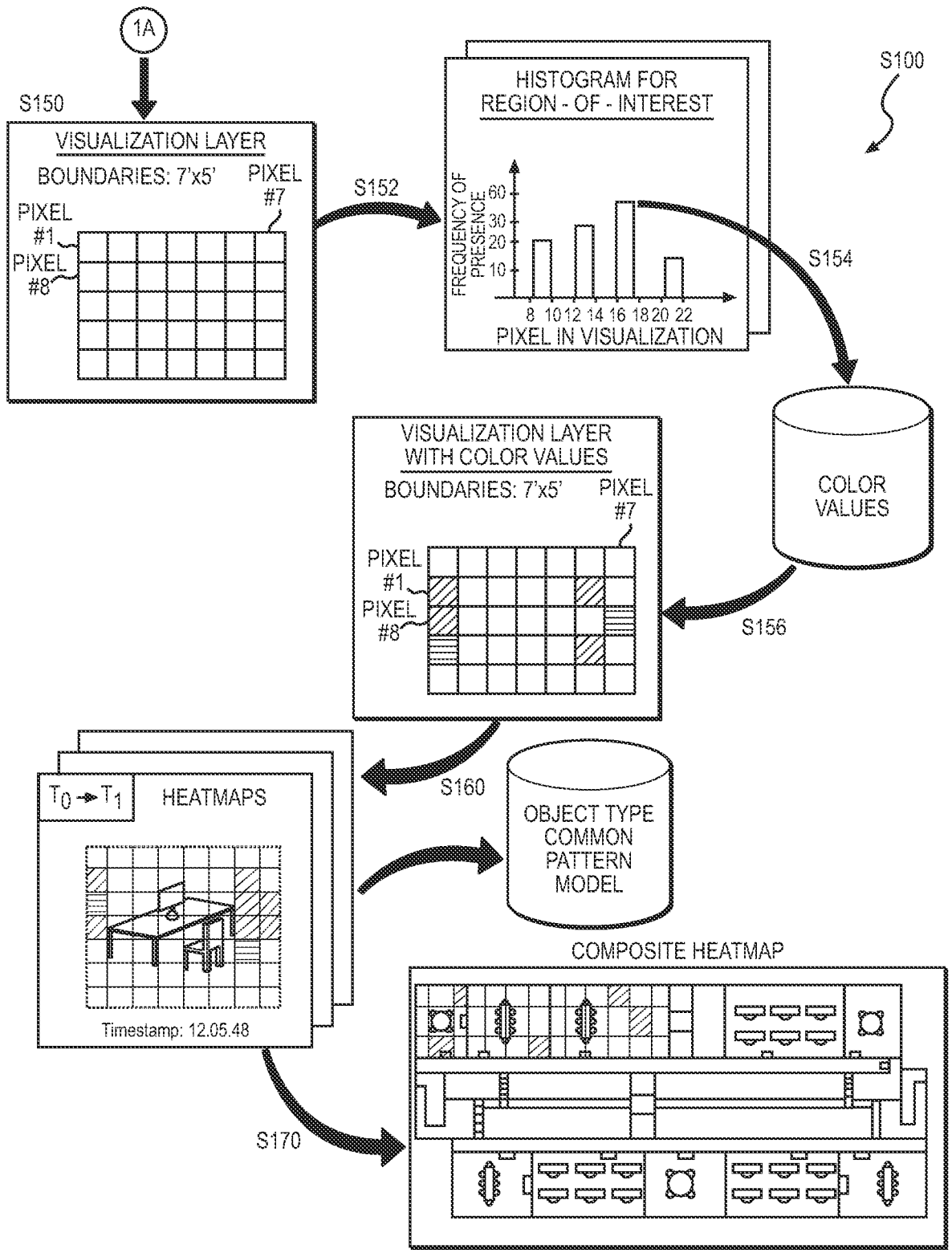

As shown in FIGS. 1A and 1B, a method S100 for debugging images and tracking objects within a space includes, during a first period at a first sensor block: capturing a first sequence of frames by an optical sensor arranged in the first sensor block in Block Silo; for each frame in the first sequence of frames, detecting a first set of objects within a first region-of-interest in the frame in Block S140; and, for each object in the set of objects, detecting an object type, in a set of object types, of the object in Block S142, and detecting a location of the object, at a time of the frame, within the first region-of-interest in the frame in Block S144. The method S100 further includes, at the first sensor block: storing object types and object locations of the first set of objects, detected in the first sequence of frames, in a first set of containers in Block S146; and transmitting the first set of containers to the computer system in Block S130.

The method S100 also includes, at the computer system: accessing a first commissioning image, captured by the first sensor block during a setup period preceding the first time period, representing the first region-of-interest in Block S148; and initializing a first visualization layer representing the first region-of-interest in Block S150.

The method S100 further includes, at the computer system, for each pixel in a set of pixels in the first visualization layer: calculating a frequency of presence of a first object type intersecting the pixel over the first time period based on the first set of containers in Block S152; calculating a color value for the pixel based on the frequency of presence in Block S154; and assigning the color value to the pixel in the first visualization layer in Block S156. The method S100 also includes, at the computer system, generating a heatmap of the first region-of-interest for the first time period based on the first visualization layer and the first commissioning image in Block S160.

1.1 Variation: Multiple Sensor Blocks+Composite Heatmap

One variation of the method S100 includes, at a first sensor block in a set of sensor blocks, during a first time period: capturing a sequence of frames depicting a region-of-interest by an optical camera arranged in the first sensor block in Block Silo; for each frame in the sequence of frames, detecting a set of objects in the frame in Block S140; for each object in the set of objects, detecting an object type, in a set of object types, of the object in Block S142; and detecting a location of the object, at a time of the frame, within the first region-of-interest in the frame in Block S144. This variation of the method S100 further includes, at the first sensor block: storing object types and object locations of the first set of objects, detected in the sequence of frames, in a set of containers in Block S146; and transmitting the set of containers to a computer system in Block S130.

This variation of the method S100 further includes, at the computer system: accessing a database of commissioning images annotated with regions-of-interest and corresponding boundaries captured by the set of sensor blocks during a setup period preceding the first time period in Block S148; and initializing a composite visualization layer representing the space in Block S150.

This variation of the method S100 also includes, at the computer system, for each pixel in a set of pixels in the composite visualization layer: calculating a frequency of presence of each object type, in the set of object types, intersecting the pixel over the first time period based on the set of containers in Block S152; calculating a color value for the pixel based on the frequency of presence in Block S154; and assigning the color value to the pixel in the composite visualization layer in Block S156. This variation of the method S100 further includes, at the computer system, generating a composite heatmap of the space representing object usage patterns of object types for the first time period based on the composite visualization layer and the database of commissioning images in Block S170.

1.2 Variation: Database of Commissioning Images

One variation of the method S100 includes: during a first time period, at a sensor block, capturing a sequence of frames depicting a region-of-interest by an optical sensor arranged in the sensor block in Block Silo; for each frame in the sequence of frames, detecting a set of objects within the region-of-interest in the frame in Block S140; for each object in the set of objects, detecting an object type, in a set of object types, of the object in Block S142; and detecting a location of the object, at a time of the frame, within the first region-of-interest in the frame in Block S144. This variation of the method S100 further includes, at the first sensor block: storing object types and object locations of the first set of objects, detected in the sequence of frames, in a set of containers in Block S146; and transmitting the set of containers to a computer system in Block S130.

This variation of the method S100 further includes at the computer system: retrieving a commissioning image annotated with a region-of-interest and a corresponding boundary from a database of commissioning images captured by the set of sensor blocks including the first sensor block during a setup period preceding the first time period in Block S148; calculating a frequency of presence of a first object type, in the set of object types, intersecting the boundary of the region-of-interest over the first time period based on the set of containers in Block S152; calculating a color value for the first object type, in the set of object types, based on the frequency of presence in Block S154; populating subregions of the commissioning image corresponding to locations of objects detected as the first object type, in the set of object types, with the color value in Block S156; and generating a heatmap of the region-of-interest for the first time period based on the commissioning image in Block S160.

2. Application

Generally, Blocks of the method S100 can be executed by a computer system and/or local gateway in conjunction with a population of sensor blocks deployed throughout a space (e.g., a workspace, an office, a conference room, a cafeteria): to detect static and dynamic objects in frames of a region-of-interest captured by these sensor blocks; to extract (x,y) coordinates representing locations of objects within a two-dimensional grid of each sensor block; to generate heatmaps—annotated with a color range (e.g., red, green, blue, black, white) and a color intensity level (e.g., dull, light, medium, bright, etc.)—representing frequency of presence of object types moving throughout the space; and to present these heatmaps to a user (e.g., an installer, manager, or administrator of the facility), thereby enabling the user to achieve and maintain awareness of locations of object types moving within the space (e.g., object usage patterns or deviations within the space) over time with no or minimal exposure of private employee (or "worker") information to the user or other entity.

Each sensor block can: capture a commissioning image of a region-of-interest upon installation; identify object types within the commissioning image; extract locations of each object type; and transmit object types and locations of these object types to the computer system. The computer system can then: initialize a visualization layer representing the region-of-interest; calculate frequency of presence of each object type within the region-of-interest; leverage the frequency of presence to calculate a color value (e.g., a color range and a color intensity) for each pixel within the visualization layer; assign the color value to each pixel within the visualization layer; and leverage the visualization layer and the commissioning image to generate a heatmap of the region-of-interest. Additionally, the computer system can: generate an augmented map of the space by overlaying heatmaps from the population of sensor blocks onto an existing floorplan and/or furniture layout of the space and by populating these heatmaps with graphical representations of object types, locations, orientations, etc. of objects detected by the sensor blocks over time; and present this map of graphical representations to the user (e.g., an installer, manager, or administrator of the facility) as a "real-time" visualization of object usage patterns of each region-of-interest within the space.

Alternatively, the population of sensor blocks and the computer system can: cooperate to transform commissioning images into tiles (e.g., chunks, patches); remove or discard tiles with humans present from memory; and assemble the remaining tiles into a vectorized commissioning image, thereby reducing the quantity of images offloaded by each sensor block, decreasing the computational compute of each sensor block, and reducing wireless transmission collisions between the population of sensor blocks and the computer system. The computer system can similarly leverage a set of vectorized commissioning images to initialize a composite visualization layer representing the space and compile a heatmap for each region-of-interest within the space into a composite heatmap of the space. The computer system can then present the composite heatmap to the user as a "real-time" visualization of object usage patterns of the space.

Furthermore, the computer system can implement regression, machine learning, and/or other techniques to develop models for (or "learn") common locations of object types and object usage patterns of the space—as a function of furniture layout, sensor block positioning, time of day, and/or human occupancy—based on heatmaps and/or the map of the space generated over time. The computer system can also: detect deviations of furniture layout and/or sensor block positioning according to a threshold amount of deviation predefined by the user; automatically generate notifications alerting the user of the deviation; and generate prompts for the user to execute an action (e.g., reposition the sensor block, update the furniture layout of the space) and to receive an action from the user (e.g., a region-of-interest boundary or capture a new commissioning image at the sensor block).

Additionally, the computer system can: collect positive user feedback responsive to these prompts; and reinforce an object usage pattern model—deployed on the sensor blocks—accordingly. Alternatively, responsive to negative feedback from the user, the computer system can retrain the object usage pattern model and update the object usage pattern model—deployed on each sensor block in the space—accordingly.

Therefore, Blocks of the method S100 can be executed by the computer system and/or local gateway in conjunction with the population of sensor blocks deployed throughout a space: to provide deeper insights into object usage patterns of the space via heatmaps; to maintain personal privacy (e.g., for employees, customers) by capturing low-resolution frames that are quickly deleted from local memory and/or by representing objects in the space with generic graphical representation of these objects populated in maps of the space; to automatically generate and serve prompts to investigate furniture layout and sensor block positioning; and to automatically retrain models for object usage patterns of the space.

The method S100 is described herein as executed by the set of sensor blocks and the computer system to detect, track, and visualize objects, and to manage object usage patterns within a space, such as an office or clinic. However, the set of sensor blocks and the computer system can similarly execute Blocks of the method S100 to detect, track, and visualize objects and to manage object usage patterns within an industrial, educational, municipal, or other setting.

3. Terms

Generally, the computer system can identify objects and the corresponding object type (e.g., desk, chair, table, couch, human, etc.) within a region-of-interest. More specifically, the computer system can: access a spatial mapping of static objects (e.g., furniture-type objects) in the region-of-interest (e.g., specifying locations within the field of the view of the optical sensor) while dynamically identifying objects (e.g., human-type objects) via an object classification model.

Furthermore, the region-of-interest—such as an anticipated high occupancy and/or high usage region of the space—intersects the field of view of the camera arranged in the sensor block and can be predefined by a user of the facility (e.g., manager, installer, or administrator of the facility) for each sensor block deployed throughout the facility. The boundary and/or set of boundaries of the region-of-interest can be defined by the user as a measurement of length of a single edge or a set of edges in customary units (e.g., inches, feet, yards, etc.) and/or as a measurement of length in metric units (e.g., centimeters, meters, kilometers, etc.) to form a region-of-interest. The computer system can then convert the boundary into units of pixels (e.g., pixels, px) corresponding to a two-dimensional grid of pixels within the field of view of the camera in each sensor block.

For example, the user can define a region-of-interest as 3' by 3' and the computer system can convert these customary units into 3,456 pixels by 3,456 pixels. The sensor block can then apply these new units of the boundary for a region-of-interest to an initialization image (or "commissioning image") captured by an optical sensor arranged in the sensor block during a setup period at each sensor block.

4. Sensor Block

A sensor block can include: an optical sensor defining a field of view; a motion sensor configured to detect motion in or near the field of view of the optical sensor; a processor configured to extract data from images recorded by the optical sensor; a wireless communication module configured to wirelessly transmit data extracted from images; a battery configured to power the optical sensor, the processor, and the wireless communication module over an extended duration of time (e.g., one year, five years); and an housing configured to contain the optical sensor, the motion sensor, the processor, the wireless communication module, and the battery and configured to mount to a surface within the field of view of the optical sensor intersecting a region-of-interest within the facility (e.g., a conference table within a conference room, a cluster of agile desks in an agile work environment).

The optical sensor can include: a color camera configured to record and output two-dimensional color images; and/or a depth camera configured to record and output two-dimensional depth images or three-dimensional point clouds. However, the optical sensor can define any other type of optical sensor and can output visual or optical data in any other format.

The motion sensor can include a passive infrared sensor (or "PIR" sensor) that defines a field of view that overlaps the field of view of the optical sensor and that passively outputs a signal representing motion within (or near) the field of view of the optical sensor. Furthermore, the sensor block can transition from an inactive state to an active state responsive to an output from the motion sensor indicating motion in the field of view of the motion sensor; the sensor block can then trigger the optical sensor to record an image (e.g., a two-dimensional color image), which may capture a source of the motion detected by the motion sensor.

In one example, the motion sensor is coupled to a wake interrupt pin on the processor. However, the motion sensor can define any other type of motion sensor and can be coupled to the processor in any other way.

In one variation, the sensor block also includes: a distance sensor (e.g., a one-dimensional infrared depth sensor); an ambient light sensor; a temperature sensor; an air quality or air pollution sensor; and/or a humidity sensor. However, the sensor block can include any other ambient sensor. In the active state, the sensor block can sample and record data from these sensors and can selectively transmit these data—paired with insights extracted from images recorded by the sensor block—to a local gateway. The sensor block can also include a solar cell or other energy harvester configured to recharge the battery.

The processor can locally execute Blocks of the method S100, to selectively wake responsive to an output of the motion sensor, to trigger the optical sensor to record a sequence of frames, to write various insights extracted from each frame of the sequence of frames, and to then queue the wireless communication module to broadcast these insights to a nearby gateway for distribution to the computer system when these insights exhibit certain target conditions or represent certain changes.

The optical sensor, motion sensor, battery, processor, and wireless communication module, etc. can be arranged within a single housing configured to install on a flat surface—such as by adhering or mechanically fastening to a wall or ceiling—with the field of view of the optical sensor facing outwardly from the flat surface and intersecting a region-of-interest within the facility.

However, this "standalone," "mobile" sensor block can define any other form and can mount to a surface in any other way.

4.1 Wired Power & Communications

In one variation, the sensor block additionally or alternatively includes a receptacle or plug configured to connect to an external power supply within the facility—such as a power-over-Ethernet cable—and sources power for the optical sensor, processor, etc. from this external power supply. In this variation, the sensor block can additionally or alternatively transmit data—extracted from images recorded by the sensor block—to the computer system via this wired connection (i.e., rather than wirelessly transmitting these data to a local gateway).

4.2 Sensor Block Output

Generally, each sensor block can generate optical data (e.g., a commissioning image, a sequence of frames) and non-optical data (e.g., object types, and locations of objects). Each sensor block can also access a specification of regions of interest populated by the computer system to overlay a corresponding boundary—defined by an administrator during the setup period for the sensor block—onto a commissioning image, extract locations (e.g., (x, y) pixel locations), within a coordinate system of each sensor block,—of the two-dimensional centroids of blobs of pixels that depict a set of objects in the first sequence of frames, annotate these data, and transmit these data to the computer system.

More specifically, for each setup period, the sensor block can annotate the commissioning image with a timestamp and a unique identifier (e.g., a UUID, MAC address, IP address, or other wireless address, etc.) pertaining to the sensor block and transmit the annotated commissioning image—overlayed with the region-of-interest partition—to the computer system, such as via a wired or wireless connection (e.g., via the local gateway).

Furthermore, for each sampling period (e.g., once per ten-minute interval, once per ten-second interval when the sensor block detects motion in its field of view) the sensor block can: capture a sequence of frames; detect a set of objects in the sequence of frames; extract locations (e.g., (x, y) pixel locations) of the set of objects in the field of view of the sensor, object types of the set of objects, and/or orientations of the set of objects; and transmit these locations, object types and/or object orientations of the set of objects to the computer system, such as via a wired or wireless connection (e.g., via the local gateway).

5. Local Gateway

A local gateway can be configured to receive data transmitted from sensor blocks nearby via wireless communication protocol or via a local ad hoc wireless network and to pass these non-optical data to the computer system, such as over a computer network or long-range wireless communication protocol. For example, the gateway can be installed near and connected to a wall power outlet and can pass data received from a nearby sensor block to the computer system in (near) real-time. Furthermore, multiple gateways can be installed throughout the facility and can interface with many sensor blocks installed nearby to collect data from these sensor blocks and to return these data to the computer system.

In one variation, a sensor block transmits a (raw or compressed) sequence of frames—recorded by the camera in the sensor block during a scan cycle executed by the sensor block while in an active state—to a nearby gateway, and the gateway executes the method S100 and techniques described below to extract insights from this sequence of frames and to return these insights to the computer system (e.g., scans the raw or compressed sequence of frames).

6. Computer System

The computer system—such as a remote server—can receive non-optical data from one or more gateways installed in the facility (or directly from sensor blocks) and can manipulate these non-optical data, to selectively trigger a prompt for a user to investigate a particular sensor block deployed within the facility, to selectively trigger a prompt for a user to update the configuration of a particular area within the facility (e.g., furniture configuration of a conference room, desk configuration within an agile work environment), execute actions (e.g., generate notifications) in response to detecting anomalies (e.g., improper sensor block installation, improper furniture configuration), to reinforce and/or update the virtual floor plan of the space, to reinforce and/or update the boundaries associated with the region-of-interest at each sensor block deployed in the space, to extract insights for anonymous object (e.g., anonymous human) usage of the space, and/or control various actuators coupled to the facility based on these data, as described below.

7. Installation: Setup Period

Generally, during a setup period, each sensor block is installed (or "deployed") within the space of the facility. A user (e.g., administrator, manager, or installer of the facility) can install each sensor block such that the field of view of the camera of the sensor block encompasses a region-of-interest within the space.

In one implementation, upon installation of the sensor block over the region-of-interest, each sensor block can capture an initialization image (or "commissioning image") of the region-of-interest, the user can manually define a boundary or a set of boundaries of the region-of-interest on the commissioning image for each sensor block. The user can enter this boundary at a user portal and the computer system can collect the boundary and populate a table (or "specification") of region-of-interests for future reference by each sensor block. Each sensor block can then apply a boundary of a region-of-interest to the commissioning image and transmit the overlayed and partitioned commissioning image to the computer system for storage in a database. Thus, the computer system can leverage the user defined boundaries to populate a specification of region-of-interests and corresponding boundaries accessible by each sensor block deployed in the space.

7.1 Commissioning Image

Furthermore, each sensor block can capture a commissioning image at the optical sensor at a time when the field of view is known to be absent of humans and/or in a default state (e.g., after cleaning or maintenance is performed within the field of view, after working hours). The computer system can collect these commissioning images from each sensor block labeled with a time stamp and a unique identifier (e.g., a UUID, MAC address, IP address, or other wireless address, etc.) and store these commissioning images from each sensor block in a database. Alternatively, each sensor block can record multiple commissioning images at the optical sensor in multiple lighting conditions to better facilitate object detection across these lighting conditions.

For example, the sensor block can: capture a commissioning image of the region-of-interest (e.g., an individual agile desk area within an agile work environment). Subsequently, each sensor block can access the specification of regions-of-interests labeled with boundaries and unique identifiers assigned to sensor blocks located within the space; select a region-of-interest, intersecting the field of view of the camera, from the specification based on the unique identifier of the sensor block in Block S120; overlay the boundaries associated with the region-of-interest onto the commissioning image in Block S122; and offload the overlayed and partitioned commissioning image, labeled with a timestamp, to the computer system in Block S130. The computer system can store the commissioning image from each sensor block in a database of annotated commissioning images. Later, the computer system can project heatmaps representing object usage patterns (e.g., a human usage pattern) of the space onto each commissioning image, as further described below.

7.2 Region-of-Interest Partitioning

In one variation, a user—such as a manager, installer, or administrator of the facility—predefines a region-of-interest—such as an anticipated high-occupancy, high-usage, or high object flow (or "object flux") region—within the field of view of each sensor block deployed in the facility. In particular, the user can manually define the boundaries of a region-of-interest (e.g., units of feet corresponding to units of pixels with (x,y) coordinates of a two-dimensional pixel grid within the field of view of the camera) on the commissioning image to form the region-of-interest for each sensor block deployed in the space at a user portal. The computer system can then collect the predefined boundaries for each sensor block from the user and populate a specification (e.g., a table, a map, a list) of region-of-interests labeled with boundaries and unique identifiers (e.g., a UUID, MAC address, IP address, or other wireless address, etc.) corresponding to each sensor block deployed within the space.

For example, a sensor block can be deployed over a region-of-interest within the space (e.g., an individual agile desk area within an agile work environment). The sensor block can implement the methods and techniques described above to capture a commissioning image and transmit the commissioning image to the computer system. The computer system can then: generate a prompt for a user to define a boundary for the region-of-interest, representing a predicted occupancy region of the space (e.g., an individual agile desk area within an agile work environment), on the commissioning image via a user portal. The user can then: define the boundary of the region-of-interest (e.g., within a grid array of six-foot-square regions) on the commissioning image to form the region-of-interest for future reference by the sensor block; and enter this boundary at the user portal. Then, in response to receiving the boundary (e.g., a 6-foot by 6-foot boundary) for the commissioning image, the computer system can: transform the boundary into an initial set of pixel locations (e.g., a 6,912-pixel by 6,912-pixel region) within a coordinate system aligned with a field of view of the optical sensor arranged in the sensor block (e.g., convert the region-of-interest partition into pixel-based boundaries within the field of view of the sensor block); represent the set of pixel locations (e.g., a 6,912-pixel by 6,912-pixel region) within the coordinate system as the region-of-interest; and aggregate the region-of-interest and the boundary into the specification of regions-of-interest.

Therefore, the region-of-interest partitions for all sensor blocks deployed in the space can be manually defined by the user at a user portal and collected by the computer system to generate a specification of region-of-interest partitions accessible by each sensor block.

7.3 Augmented Map: Existing Floor Plan+Existing Furniture Layout

In one variation, the computer system can be configured to access an existing digital two-dimensional or three-dimensional floor plan of the space (e.g., conference room, agile work environment) and/or an existing digital two-dimensional or three-dimensional furniture layout of the space, labeled with furniture object types (e.g., chair, table, desk, etc.). Furthermore, the computer system can retrieve the existing digital two-dimensional or three-dimensional floorplan and furniture layout of the space and combine the floorplan and furniture layout to generate an augmented two-dimensional map of the space, informed by the database of annotated commissioning images.

For example, during the setup period, the computer system can: access a floorplan of the space; access a furniture layout of the space labeled with furniture object types and furniture locations; and generate an augmented two-dimensional map of the space based on the floorplan and the furniture layout of the space. The computer system can then execute Blocks of the method S100 to generate a heatmap representing locations of an object type within a region-of-interest and to project this heatmap onto the augmented two-dimensional map of the space to derive an object usage pattern from locations of the object type within the space, as further described below.

7.4 Augmented Map: Existing Floor Plan+Absent Furniture Layout

In another variation, if a digital furniture layout of the space is absent, the computer system can prompt each sensor block to capture a commissioning image of the region-of-interest to identify the furniture layout and/or label static objects (e.g., desks, tables, chairs, couches, printers, etc.) within the region-of-interest—defined by a two-dimensional pixel grid within the field of view of the camera—with locational context.

More specifically, each sensor block can automatically (e.g., via an object classification model) classify various furniture object types (e.g., chairs, desks, tables, couches) of objects detected within a region-of-interest of the commissioning image captured at each sensor block. Alternatively, the user (e.g., manager, installer, or administrator of the facility) can manually label furniture object types within each region-of-interest on the existing digital two-dimensional or three-dimensional floor plan of the space for future reference by the sensor block. Each sensor block can annotate the commissioning image with furniture object type labels (e.g., automatically classified by the sensor block or manually labeled by the user) and transmit the annotated commissioning image to the computer system.

Furthermore, the computer system can then implement the methods and techniques described above to combine the existing digital two-dimensional or three-dimensional floor plan of the space with the database of annotated commissioning images to populate an augmented two-dimensional map of the space labeled with furniture object types and furniture locations. For example, the sensor block can detect an initial set of objects in the commissioning image within the boundary of the region-of-interest. Then, for each object in the initial set of objects, the sensor block can: detect an initial object type, in the set of object types, of the object (e.g., a chair, a desk, a table, a couch); and detect an initial location of the object within the first region-of-interest. The sensor block can then annotate the commissioning image with the furniture object types and initial locations of objects and leverage the floorplan of the space and the commissioning image to generate the augmented two-dimensional map of the region-of-interest.

Then, the computer system can: access a database of template graphical representations (e.g., graphics, symbols, icons) associated with each object type; select a furniture-type object graphical representation (e.g., a desk) from the database; arrange and project the furniture-type object graphical representation on top of all pixels labeled "desk" in the augmented two-dimensional map; select a human object type graphical representation (e.g., a human) from the database; arrange and project the human object type graphical representation, on top of all pixels labeled "human" in the augmented two-dimensional map; and present the augmented two-dimensional map to a user depicting furniture-type and human object type.

Therefore, the computer system can leverage locational context from the database of annotated commissioning images to inform object classification for an augmented two-dimensional map of the space.

8. Video Capture+Frame Rate

Generally, during a given time period, each sensor block can capture a sequence of frames by the optical sensor—arranged in the sensor block—depicting a region-of-interest, in response to presence of motion in the field of view of the camera.

In one implementation, the sensor block can access a sequence of low-resolution frames captured by the optical sensor at a frequency less than one hertz (e.g., one frame per ten-second or ten-minute interval) to extract locations of humans detected in the frames and to derive object usage patterns of the space (e.g., human usage pattern of a conference room, human usage pattern of a cafeteria, human usage pattern of an agile desk environment). Furthermore, the sensor block can temporarily and locally store the sequence of low-resolution frames until the sensor block detects objects and extract locations of these objects based on a single frame and/or a sequence of frames, at which time, the sensor block can delete the single frame and/or sequence of frames from temporary storage.

For example, in response to detecting absence of motion in a field of view of a motion sensor arranged in the sensor block, the sensor block can capture the first commissioning image of the region-of-interest at the optical sensor during a setup period. Then, in response to detecting presence of motion in the field of view of the motion sensor, during a first time period, the sensor block can: capture an initial frame at the optical sensor at a first resolution; detect an initial set of features in the initial frame; identify the initial set of features as a human object type; extract an initial pixel location of the initial set of features representing the human object type; and store the initial frame in memory. Then, in response to detecting absence of motion in the field of view of the motion sensor during the first time period, the sensor block can: capture the sequence of frames at a second resolution greater than the first resolution; and discard the initial frame from memory.

Therefore, the sensor block can address privacy concerns related to the deployment of sensor blocks within the facility by reducing the possibility of accessing or recovering the optical data depicting employees or workers captured by the optical sensor in each sensor block.

8.1 Sequence of Frames

In one variation, the sensor block can execute Blocks of the method S100 to capture the commissioning image, overlay the commissioning image with a particular boundary to form the region-of-interest in Block S122, and transmit the annotated commissioning image to the computer system in Block S130. During a given time period (e.g., one hour, one day, three days, etc.), the sensor block can then capture a sequence of low-resolution frames at the optical sensor, extract non-optical data (e.g., locations and orientations of objects), and offload these non-optical data to the computer system.

In one implementation, the sensor block can: capture a sequence of frames at the optical sensor; and detect a set of objects in a first frame, in the sequence of frames, within the region-of-interest. Then, for each object in the set of objects, the sensor block can: detect a set of features in each frame; identify the set of features as an object type; extract a pixel location of the set of features representing the object type from each frame; and store the pixel location and the object type in a container in a set of containers representing the sequence of frames. The sensor block can then transmit the set of containers to the computer system. The computer system can then execute Blocks of the method to generate a heatmap for the sequence of frames and/or to generate a composite heatmap for the sequence of frames.

In one example, the sensor block captures a first sequence of frames at the optical sensor during a given time period (e.g., one day). Then, for a first frame in the sequence of frames, the sensor block detects a set of objects (e.g., a set of humans) within the region-of-interest (e.g., an agile work environment) intersecting the field of view. For a first object in the set of objects, the sensor block: detects a cluster of pixels representing a first human in the first frame; identifies the cluster of pixels as a human object type of the first human; calculates a centroid of the first human based on the cluster of pixels; and detects the location of the centroid of the first human, at the time of the frame (e.g., a timestamp), within the region-of-interest in the frame; and stores this location and the centroid of the first human in a container in a set of containers. The sensor block then transmits this set of containers to the computer system. The computer system then: initializes a visualization layer representing the region-of-interest and for each pixel in a set of pixels in the visualization layer: calculates the frequency of presence of the human object type intersecting the pixel over the given time period based on the set of containers; calculates a color value (e.g., a color range and a color intensity) for the pixel based on the frequency of presence; and assigns the color value to the pixel in the visualization layer. The computer system then generates a heatmap representing locations of the human object type or a human object type pattern within the agile work environment for the given time period (e.g., one day).

The sensor block can implement similar methods and techniques for each other frame in the sequence of frames, for each other set of objects in the sequence of frames, and transmit each other location (e.g., (x, y) pixel location) of the set of humans to the computer system to generate a heatmap for the sequence of frames representing an object usage pattern of the space (e.g., human usage pattern of the space) during the given time period (e.g., one day).

In another example, the sensor block captures a first sequence of frames at the optical sensor during a given time period (e.g., between 11 AM and 2 PM). Then, for a first frame in the sequence of frames, the sensor block detects a set of objects (e.g., a set of chairs, a table) within the region-of-interest (e.g., a conference room) intersecting the field of view. For a first object in the set of objects, the sensor block: detects a cluster of pixels representing a conference table in the first frame; identifies the cluster of pixels as a table object type in the first frame; calculates a centroid of the conference table based on the cluster of pixels; detects the location of the centroid of the conference table, at the time (e.g., a timestamp) of the first frame, within the conference room in the first frame; and stores the location and the centroid of the conference table in a container in a set of containers. The sensor block then transmits this set of containers to the computer system. The computer system then initializes a visualization layer representing the conference room and for each pixel in a set of pixels in the visualization layer: calculates the frequency of presence of the table object type intersecting the pixel over the given time period based on the set of containers; calculates a color value (e.g., a color range and a color intensity) for the pixel based on the frequency of presence; and assigns the color value to the pixel in the visualization layer. The computer system then generates a heatmap representing locations of the table object type within the conference room for the given time period (e.g., between 11 AM and 2 PM).

Therefore, the computer system can: generate heatmaps that represent object usage patterns of the space for given time periods; track how these object usage patterns of the space deviate from each other; and reduce the possibility of collecting personal employee (or "worker") information from the sequence of frames.

9. Heatmap+Visualization

Generally, the computer system can combine the annotated commissioning images with (x,y) pixel locations extracted from each sensor block—annotated with a color range (e.g., red, green, blue, black, white) and a color intensity level (e.g., dull, light, medium, bright, etc.)—to generate heatmaps representing object usage patterns of the space.

In one implementation, the computer system can initialize a visualization layer of the region-of-interest depicted in the commissioning image and for each pixel in a set of pixels within the visualization layer: leverage object types and locations of objects to calculate a frequency of presence of each object type intersecting the pixel over the first time period; calculate a color value for the pixel based on the frequency of presence; and assign the color value to the pixel in the visualization layer. The computer system can then leverage the visualization layer and the annotated commissioning image to generate a heatmap of the region-of-interest for the first time period.

In one variation, the computer system can generate a heatmap by projecting a two-dimensional histogram onto the commissioning image corresponding to a sensor block and present this heatmap to the user via the user portal. The computer system can repeat this method and technique for each other sensor block deployed throughout the space.

In another variation, the computer system can implement methods and techniques described above to generate the augmented two-dimensional map of the space and the computer system can project heatmaps onto the augmented two-dimensional map to generate a composite visualization layer of object usage patterns of the space.

In yet another variation, the computer system can implement methods and techniques described above to initialize a visualization layer for each region-of-interest associated with each sensor block deployed throughout the space and aggregate these visualization layers into a composite heatmap representing object usage patterns of the space.

9.1 Heatmap: Two-Dimensional Histogram

In one variation, the computer system can generate a two-dimensional histogram and project the two-dimensional histogram onto the commissioning image for each sensor block to generate a heatmap representing object usage patterns of the space.

More specifically, the computer system can distribute the locations of objects extracted from each sensor block onto the corresponding pixel locations of the two-dimensional histogram to depict the amount of objects located at a recurring (x,y) pixel location within the two-dimensional histogram. The two-dimensional histogram can depict all of the objects detected within sequences of frames captured by the optical sensor in each sensor block over a given time period (e.g., two days, one week) and represent the occurrence of an object located at a particular (x,y) pixel location with a color value—such as a RGB color value (e.g., 0, 101, 255) or a hex color code (e.g., #0165fc)—including a color intensity level of pixels (e.g., dull, light, medium, bright) within a color range (e.g., red, green, blue, black, white).

In one implementation, the sensor block can execute Blocks of the method S100 to transmit locations of objects to the computer system for generation of the heatmap. The computer system can: assign a color range for each object type (e.g., red for a human object type, green for a table object type, blue for a chair object type); plot the locations of each object type onto the corresponding pixel location of the two-dimensional histogram labeled with the same object type (e.g., human object type). Then, for each additional occurrence of a location of an object onto the corresponding occupied pixel location of the two-dimensional histogram, the computer system can increase the color intensity level (e.g., bright red) of this occupied pixel location to represent frequent occurrence of an object at this occupied pixel location. Lastly, the computer system can generate a heatmap by projecting the two-dimensional histogram onto the commissioning image corresponding to the sensor block and present this heatmap to the user via the user portal.

For example, the computer system can: initialize a histogram of a first object type intersecting pixels of a first visualization layer representing the region-of-interest; and assign a color range (e.g., blue) to the first object type (e.g., a table object type) intersecting a first pixel. Then, in response to the frequency of presence of the first object type (e.g., 90%) exceeding a threshold frequency (e.g., 75%), the computer system can calculate a color intensity level (e.g., bright) for the first pixel; calculate a color value (e.g., 843, rgb(0, 150, 255)) for the first pixel leveraging the color range and the color intensity level; and assign the color value (e.g., 843) to the first pixel within the histogram.

The computer system can repeat methods and techniques described above for each other object type and for each other pixel to assign color values to pixels within the histogram. The computer system can then project this histogram of a set of object types, annotated with color values, onto the commissioning image to generate a heatmap of the region-of-interest.

Thus, the computer system can represent the color intensity level of pixels within a two-dimensional histogram as the frequency of presence of an object type in the subregion of the region-of-interest and/or the amount of (x,y) pixel locations of an object falling within a subregion of the region-of-interest (e.g., how often the subregion of space was occupied) within the field of view of the sensor block.

In one example, the two-dimensional histogram represents a set of humans (e.g., five humans) detected in a sequence of frames over a given time period (e.g., 10 minutes) and occurring within the region-of-interest (e.g., a conference table within a conference room).

In another example, the two-dimensional histogram represents a single human detected in a sequence of frames over a given time period (e.g., 15 minutes) and occurring within the region-of-interest (e.g., an agile desk within an agile work environment).

In yet another example, the two-dimensional histogram represents a set of humans (e.g., 17 people) all seated and grouped near each other as detected in a sequence of frames over a given time period (e.g., five seconds) and occurring within the region-of-interest (e.g., a table within a cafeteria).

9.2 Visualization: Heatmap+Augmented Map

In one variation, the computer system can implement the methods and techniques described above to generate the augmented two-dimensional map of the space during the setup period (e.g., installation period). During a given time period (e.g., one hour, six hours, one day, etc.), the computer system can project the heatmap for the sequence of frames onto the augmented two-dimensional map to generate a visual representation of the object pattern usage of the space (e.g., human usage pattern of the space) for an user.

For example, the computer system can: access the existing digital floor plan and the existing digital furniture layout of the space; overlay the existing digital furniture layout of the space onto the existing digital floor plan; and project the heatmap from each sensor block onto the existing digital floor plan in order to generate a visual representation of object usage patterns within the space (e.g., human usage pattern of the space).

The computer system can repeat these methods and techniques for each other time period to generate heat maps and a "real-time" visualization of object usage patterns within the space.

9.3 Visualization: Composite Heatmap

In one variation, the computer system can implement methods and techniques described above to generate a visualization layer for each region-of-interest associated with each sensor block deployed throughout the space and aggregate these visualization layers into a composite heatmap of the space representing object usage patterns of the space in Block Silo.

For example, a user may wish to review all heatmaps of the space for a particular time period (e.g., peak human occupancy) to develop insights of object usage patterns for this particular time period. The user may request a composite visualization layer of the space between 9 AM and 11 AM via the user portal. The computer system can then trigger the sensor block to: capture a sequence of frames depicting a first region-of-interest (e.g., an agile work environment) by the optical sensor arranged in the sensor block between 9 AM and 11 AM; and detect a set of objects in the sequence of frames. Then, the computer system can implement the methods and techniques described above to: transmit containers to the computer system; initialize a first visualization layer representing the first region-of-interest (e.g., an agile work environment); and generate a first heatmap of the region-of-interest (e.g., an agile work environment) between 9 AM and 11 AM based on the annotated commissioning image and the first visualization layer.

The computer system can repeat these methods and techniques for each other region-of-interest and for each other visualization layer to generate a set of heatmaps representing each other region-of-interest (e.g., a set of conference rooms, a reception area, a lounge area, a set of agile work environments) and aggregate this set of heatmaps into a composite heatmap of the space representing object usage patterns between 9 AM and 11 AM.

Alternatively, the computer system can implement the methods and techniques described above to: initialize a composite visualization layer representing the space (e.g., an office space); and generate a composite heatmap of all regions-of-interest within the space (e.g., an office space) between 9 AM and 11 AM based on the annotated commissioning image and composite visualization layer.

Furthermore, the computer system can present the composite heatmap of the space between 9 AM and 11 AM to the user via the user portal and thus enable the user to timely review object usage patterns for each region-of-interest within the space between 9 AM and 11 AM and develop insights from these object usage patterns.

10. Autonomous Condition+Action

In one implementation, the computer system can: track anonymous objects (e.g., humans) within the space over a given time period (e.g., one day, one week, one month); derive and learn models for common locations of object types and object usage patterns within the space (e.g., recurring (x,y) pixel locations for a human-type object in the space); detect deviations from these common locations of object types and object usage patterns between a first frame and a subsequent second frame and/or between a live sequence of frames; and execute actions (e.g., generate notifications, generate prompts) in response to detecting such deviations to alert the user to investigate the heatmaps and/or augmented two-dimensional map.

Generally, the computer system can learn common locations of object types and object usage patterns of the space as a function of furniture layout, sensor block positioning, time of day and/or as a function of occupancy. More specifically, object usage patterns of the space as a function of furniture layout can include furniture layout reconfiguration based on a deviation between a first heatmap generated during a first time period and a subsequent heatmap generated during a second time period. Similarly, object usage patterns of the space as a function of sensor block positioning can include sensor block reconfiguration based on a deviation between a first heatmap generated during the first time period and a subsequent heatmap generated during the second time period. The object usage patterns of the space as a function of time of day can include high frequency of human-type objects at a particular location within the region-of-interest (e.g., table within a cafeteria) during a given time period (e.g., between 12 PM and 1 PM). The object usage patterns of the space as a function of human occupancy can include monitoring usage of the space by human object types and detecting desk object type availability based on detecting a desk as occupied with human present, occupied with human absent, and/or vacant.

Furthermore, in response to detecting a deviation from the common location of object types and/or the object usage patterns of the space, the computer system can: generate a notification alerting the user to investigate the deviation; highlight the heatmap on the augmented two-dimensional map and/or present the heatmap overlayed on the commissioning image to the user defining the deviation; and transmit the notification, the augmented two-dimensional map, and/or the overlayed heatmap to the user, thereby enabling the user to timely review and focus attention on the deviation from the common location of object types and/or the object usage pattern of the space.

Then, if the user confirms the deviation, the computer system can reinforce the object usage pattern model identifying the deviation as abnormal. Additionally or alternatively, if the user discards the deviation or indicates the deviation as unactionable, the computer system can relabel the deviation as "normal" and mute notifications for similar future object usage pattern deviations.

10.1 Modeling: Common Locations of Object Types

In one variation, the computer system can: track object types within the space over a period of time; detect common locations of object types repeating at a high frequency within regions-of-interest and during a period of time (e.g., one day, one week); and derive object usage pattern models based on these common locations of object types.

For example, the sensor block can execute Blocks of the method S100 to: detect a set of objects (e.g., human-type objects) within a region-of-interest (e.g., a conference room); and extract locations of each object in the set of objects (e.g., each human in the set of humans). Then, the computer system can: track the locations of this set of objects as repeating at a high frequency at a particular location (e.g., (3,456, 3,456)) within the region-of-interest (e.g., at a conference table within a conference room); track the frequency of each object located at this particular location during future time periods; generate a heatmap depicting the frequency of this particular location with a color range and a color intensity level (e.g., bright red); define an object usage pattern based on the heatmap depicting the frequency of the objects detected at the particular location; leverage the pattern of the common locations of the set of objects for the region-of-interest to generate an object usage pattern model; and transmit the object usage pattern model to all sensor blocks with a similar region-of-interest deployed in the space.

Therefore, the computer system can derive patterns of common locations of object types and leverage these patterns of common locations of object types to learn object usage pattern models, implemented by the sensor blocks deployed throughout the space.

11. User Validation of Model

In one implementation, the computer system can execute the methods and techniques described above to: detect common locations of object types in the space; detect normal object usage patterns of the space; and detect a deviation from the normal object usage pattern. Then, responsive to the deviation falling below a threshold amount of deviation, the computer system can reinforce the object usage pattern model. However, responsive to the deviation exceeding the threshold amount of deviation, the computer system can generate a notification for the deviation; prompt the user to investigate the deviation and provide an action in Block S180. Responsive to the user's confirmation of the deviation, the computer system can reinforce the object usage pattern model, receive an action from the user to activate a sensor block to capture a new commissioning image, and receive a new boundary or a set of boundaries for a region-of-interest partition for the sensor block. Responsive to the user's indication of normal object usage pattern (or "not a deviation"), the computer system can relabel the object usage pattern as normal and mute future related deviation notifications at the user portal.

11.1 Furniture Layout Deviation+Forward Image Capture

In one variation, the computer system can identify a match or mismatch in the furniture configuration (or "furniture layout") within a region-of-interest based on deviations from common locations of object types and normal object usage patterns between a first frame and a subsequent second frame or between a live sequence of frames.

More specifically, the computer system can leverage a predefined threshold amount of deviation from a normal object usage pattern (e.g., 10% of (x,y) pixel locations deviated from common (x,y) pixel locations between frames) to identify a furniture layout mismatch between frames. Then, in response to the deviation falling below the threshold amount of deviation, the computer system can reinforce the object usage pattern model for the furniture layout match.

Additionally, in response to the deviation exceeding the threshold amount of deviation, the computer system can generate a notification alerting the user that a deviation occurred from the normal object usage pattern and present heatmaps from two time periods (e.g., day 1-Tuesday and day 2-Friday) and/or the "real-time" augmented two-dimensional map. In response to the user confirming a mismatch furniture configuration, the computer system can activate image capture at the sensor block—where the furniture layout mismatch occurred—to collect a new commissioning image for future reference by the sensor block. Conversely, in response to the user indicating normal furniture layout, the computer system can relabel the object usage pattern as normal and mute future related deviation notifications at the user portal.

Figure 2:
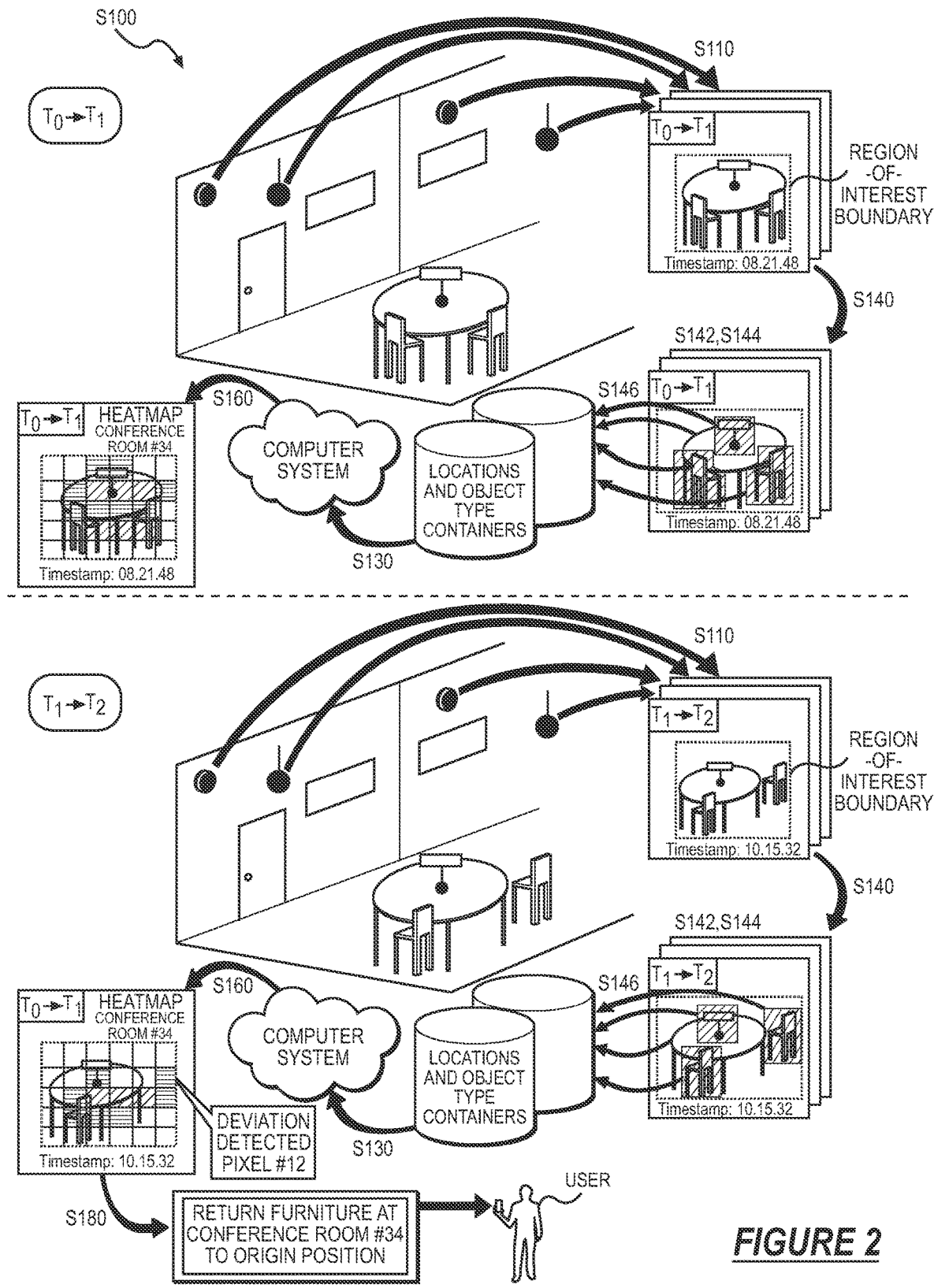
FIG. 2 is a flowchart representation of one variation of the method.

For example, the computer system can implement methods and techniques described above to generate a heatmap of a conference room for a first time period (e.g., Monday between 11 AM and 2 PM). Then, during a next time period (e.g., Tuesday between 11 AM and 2 PM), the sensor block can: capture a second frame of the conference room; extract a second set of features from the second frame; identify the second set of features as the conference table; extract a second location of the conference table from the second frame; and transmit the second location of the conference table to the computer system. The computer system can then detect a furniture deviation between the second location of the conference table for this time period (e.g., Tuesday between 11 AM and 2 PM) and a pixel location of the conference table in the heatmap of the conference room for the first time period (e.g., Monday between 11 AM and 2 PM). Then, in response to the furniture deviation exceeding a threshold furniture deviation for the conference room, the computer system can: generate a prompt for a user to move the conference table to the pixel location (e.g., common pixel location) depicted in the heatmap for the first time period; and serve the prompt, the heatmap, and the second pixel location of the conference table to the user, as shown in FIG. 2.

Further, the computer system can be configured to identify a sensor block defining a field of view that intersects a location of a deviated furniture configuration (e.g., greater than the threshold amount of deviation) and activate image capture—rather than or in addition to object usage pattern extraction—at the sensor block. Then, the computer system can: activate the sensor block to capture a new commissioning image when objects are absent; prompt the user (e.g., manager, installer, or administrator of the facility) to relabel and define a boundary or a set of boundaries of the new region-of-interest within this commissioning image; retrain the object usage pattern model; and update the retrained model to the sensor block or to all sensor blocks deployed in the space with a similar furniture layout deviation.

11.2 Sensor Block Positioning Deviation+Forward Image Capture

In one variation, the computer system can identify a match or mismatch in the positioning of a sensor block within the space by detecting deviations from common locations of object types and normal object usage patterns between a first frame and a subsequent second frame or between a live sequence of frames.

More specifically, the computer system can leverage a predefined threshold amount of deviation from the normal object usage pattern (e.g., 20% of (x,y) pixel locations deviated from common (x,y) pixel locations between frames) to identify a sensor block positioning match between frames. Then, in response to the deviation falling below the threshold amount of deviation, the computer system can reinforce the object usage pattern model for the sensor block positioning match.

Alternatively, the computer system can leverage the predefined threshold amount of deviation from the normal object usage pattern (e.g., 20% of (x,y) pixel locations deviated from common (x,y) pixel locations between frames to identify a sensor block positioning mismatch (or "deviation"). In response to the deviation exceeding the threshold amount of deviation, the computer system can generate a notification alerting the user that a deviation from the normal object usage pattern occurred and prompt the user to reinstall the sensor block onto the initial position (e.g., position during the setup period). In response to the user confirming a sensor block positioning deviation, the computer system can activate image capture at the sensor block—where the sensor block positioning deviation occurred—to collect a new commissioning image for future reference by the sensor block.

For example, the user may have replaced the battery inside of a sensor block and then reinstalled the sensor block in a different position than the initial position during the setup period. Then, in response to the deviation exceeding the threshold amount of deviation (e.g., 20% of (x,y) pixel locations deviated from common (x,y) pixel locations between frames), the computer system can identify a sensor block positioning deviation. Accordingly, the computer system can prompt the user to investigate the sensor block and adjust the position of the sensor block to the initial position from the setup period. The computer system can then reinforce the object pattern usage model for this sensor block positioning deviation.

11.3 Human Object Type Deviation

In one variation, the computer system can execute Blocks of the method S100 to calculate the frequency of presence of human object types within a region-of-interest and to generate a heatmap of each human object type in the region-of-interest. The computer system can then: detect common locations of human object types in the space; detect normal human usage patterns of the space; and detect a deviation from the normal human usage pattern between two time periods and/or between a particular pixel of two heatmaps.

More specifically, the computer system can characterize a difference between the frequency of presence of a human object type intersecting a particular pixel of a heatmap for a first time period and the particular pixel of a next heatmap for a subsequent time period. Then, in response to the frequency of presence of the human object type intersecting the particular pixel of the heatmap for the subsequent time period falling below the frequency of presence of the human object type intersecting the particular pixel of the heatmap for the first time period, the computer system can detect a human object type deviation and highlight the particular pixel in the corresponding heatmaps as the deviation.

For example, the sensor block can implement methods and techniques described above to generate a first heatmap of a human object type in the region-of-interest for a first time period. Then, during a subsequent time period, the sensor block can: capture a second sequence of frames at the optical sensor; for each frame in the second sequence of frames, detect the first human within the first region-of-interest in the frame; detect a human object type, in the set of object types, of the first human; and detect a location of the first human, at a time of the frame, within the first region-of-interest in the frame. The sensor block can then: store human object types and locations of the first human, detected in the second sequence of frames, in a second set of containers; and transmit the second set of containers to the computer system.

The computer system can then: initialize a second visualization layer representing the first region-of-interest; calculate a second frequency of presence of the human object type, in the set of object types, intersecting the first pixel in the second visualization layer over the second time period based on the second set of containers; calculate the color value for the first pixel based on the second frequency of presence; assign the color value to the first pixel in the second visualization layer; and generate a second heatmap of the first region-of-interest for the second time period based on the second visualization layer and the commissioning image.

Figure 3:
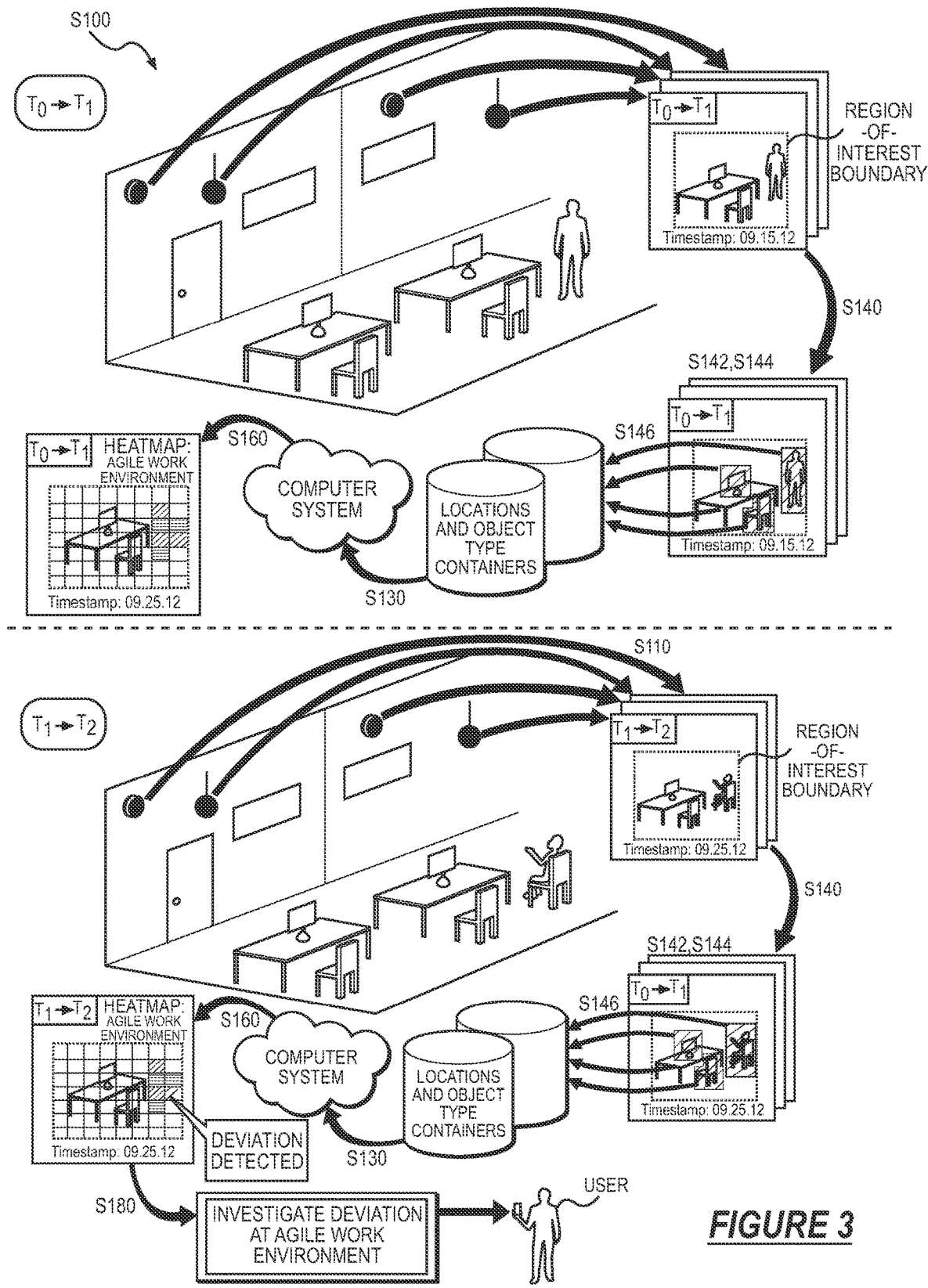
FIG. 3 is a flowchart representation of one variation of the method.

Then, in response to the second frequency of presence of the human object type falling below the frequency of presence of the human object type intersecting the first pixel (e.g., normal human object type pattern for the first pixel), the computer system can: highlight the first pixel in the second heatmap as a deviation of the human object type between the first heatmap and the second heatmap; generate a prompt for an user to investigate the deviation of the human object type between the first heatmap and the second heatmap; and serve the prompt, the first heatmap, and the second heatmap to the user via the user portal, as shown in FIGS. 1A, 1B, and 3.

Therefore, the computer system can detect a human object type deviation within a particular pixel between a set of heatmaps corresponding to different time periods. Further, the computer system can: present these heatmaps—highlighted with the deviation and with no or minimal exposure of private employee (or "worker") information—to a user; and thereby enable a user to timely review patterns of anonymous human object types interacting with furniture object types within a region-of-interest of the space.

12. Variation: Image Tiling+Reconstruction

Figure 4:
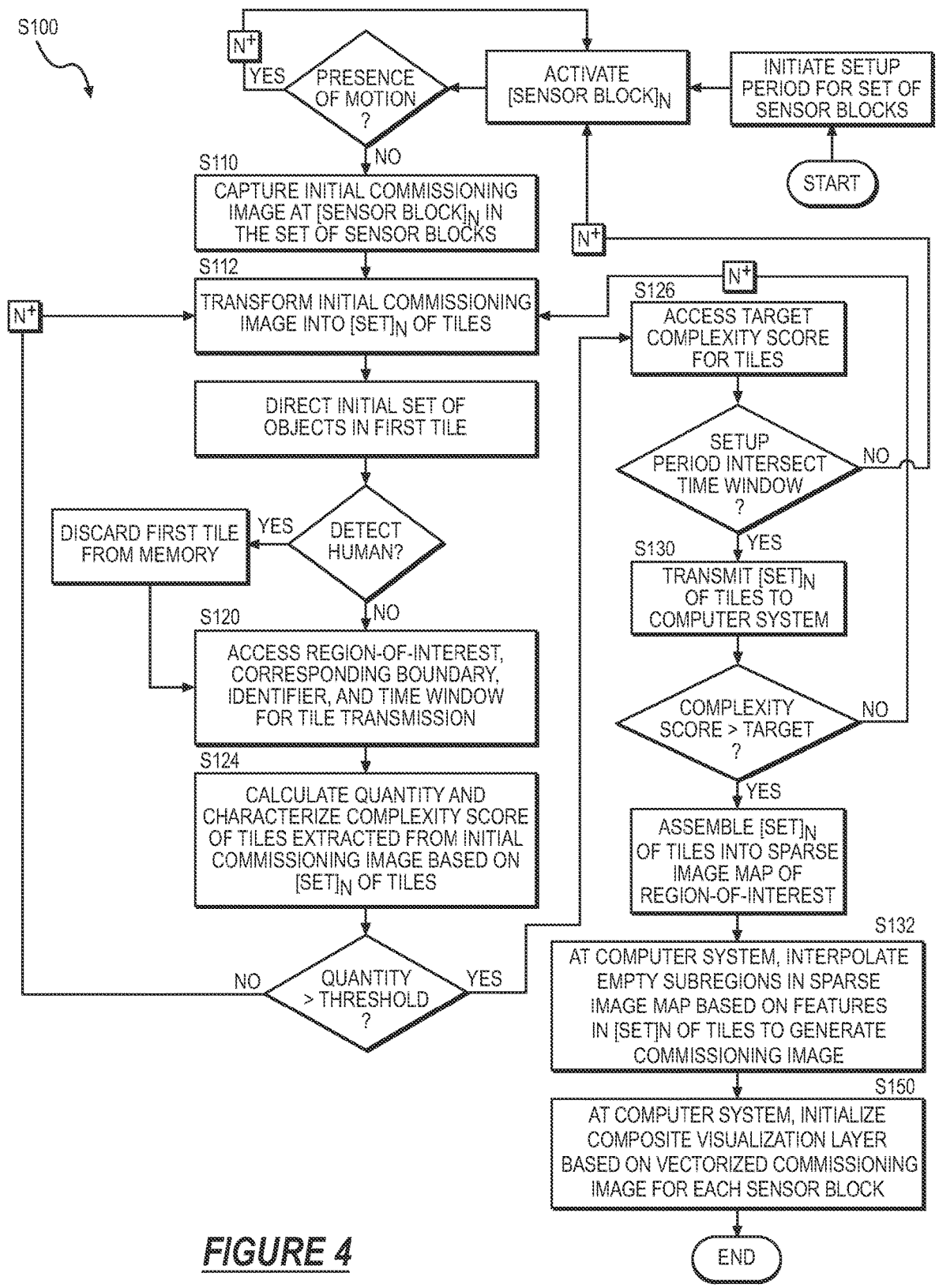
FIG. 4 is a flowchart representation of one variation of the method.

In one variation, each sensor block deployed throughout the space can capture a commissioning image of a region-of-interest and transform the commissioning image into a set of tiles (e.g., chunks, patches) representing subregions of the region-of-interest depicted in the commissioning image. The sensor block can then discard tiles depicting a human, access a particular object type as a priority, and transmit the remaining tiles, prioritizing the particular object type, to the computer system to reconstruct a floorplan of the region-of-interest. The computer system can then execute Blocks of the method S100 to generate a heatmap of the space, as shown in FIG. 4.

More specifically, the sensor block can: capture the commissioning image; detect a human object type present in the commissioning image; and remove (e.g., discard) a set of tiles from the commissioning image depicting this human. The sensor block can then transmit this set of tiles to a computer system and the computer system can assemble the remaining tiles into a sparse image map of the region-of-interest and interpolate a set of empty subregions in the sparse image map based on features in the set of tiles to generate the commissioning image depicting only the floorplan (e.g., a floor and walls) and furniture object types (e.g., chairs, desks, tables).

Furthermore, the computer system can also implement an image reconstruction model configured to reassemble a set of tiles extracted from a commissioning image, by each sensor block, into a floorplan of the region-of-interest associated with the commissioning image. Additionally, the computer system can leverage these floorplans of regions-of-interest to generate a composite floorplan or furniture layout of the space.

Thus, the population of sensor blocks and the computer system can: cooperate to transform commissioning images into tiles; remove tiles with humans present; reassemble the remaining tiles into a floorplan representation of a region-of-interest; and thereby reduce the quantity of images offloaded by each sensor block, decrease the computational compute of each sensor block, and reduce wireless transmission collisions between the population of sensor blocks and the computer system.

12.1 Image Tiling

In one implementation, during the setup period, the sensor block can capture an initial commissioning image depicting a region-of-interest and transform this initial commissioning image into a population of tiles representing subregions of the region-of-interest. The sensor block can then leverage object detection techniques, an image coverage threshold and/or a target complexity score, a tile quantity threshold, or the specification of region-of-interest partitions to selectively transmit tiles in the population of tiles to the computer system, as shown in FIG. 4.

Furthermore, the computer system can access a tile quantity threshold and a target complexity score, defined over a period of time (e.g., one day, one week, one month), and assign a time window for tile transmission to each unique identifier (e.g., a UUID, MAC address, IP address, or other wireless address) representing a sensor block in the population of sensor blocks within the specification of region-of-interest. The computer system can then distribute the tile quantity threshold and the target complexity score to the population of sensor blocks to selectively filter tiles prior to transmission according to these thresholds.

Additionally or alternatively, the computer system can autonomously define a tile quantity threshold and the target complexity score for the population of sensor blocks over a given time period (e.g., one week, one month, three months) and selectively filter tiles upon receiving tiles from each sensor block.

In one variation, the sensor block can capture a commissioning image at the optical sensor, transform the commissioning image into a set of tiles in Block S112, and implement object detection techniques to detect presence of human object types within this set of tiles. Then, in response to detecting presence of a human object type within the set of tiles, the sensor block can discard tiles depicting the human object type prior to tile transmission to the computer system. Additionally, the sensor block can leverage the tile quantity threshold and the specification of regions-of-interest to selectively transmit remaining tiles to the computer system.

For example, during the setup period, the sensor block can: capture an initial commissioning image depicting a region-of-interest; transform the initial commissioning image into a set of tiles, each tile in the set of tiles depicting a subregion of the region-of-interest in Block S112; detect a set of humans depicted in a first subset of tiles, in the set of tiles in Block S114; and, in response to detecting the set of humans in the first subset of tiles, discard the first subset of tiles from memory. The sensor block can then: calculate a quantity of tiles extracted from the initial commissioning image based on the set of tiles in Block S124; and extract the region-of-interest, a corresponding boundary, and a time window for tile transmission from the specification based on an identifier associated with the sensor block and, in response to the quantity of tiles exceeding a threshold quantity of tiles and in response to the setup period intersecting the time window for tile transmission, transmit the set of tiles, excluding the first subset of tiles, to the computer system for generation of the first commissioning image in Block S130.

Additionally or alternatively, during the setup period, the computer system can: access a target in Block S126 score for tiles (e.g., a score representing the complexity of features within each tile); characterize a complexity score of each tile in the set of tiles, excluding the first subset of tiles, based on features in the set of tiles; and, in response to the complexity score of a second subset of tiles in the set of tiles exceeding the target complexity score, interpolate the set of empty subregions in the sparse image map based on features in the second subset of tiles to generate the first commissioning image in Block S132.

Therefore, the sensor block can leverage the tile quantity threshold, a complexity score, and a time window defined in the specification of regions-of-interest to selectively discard tiles and transmit remaining tiles to the computer system.

12.2 Image Reconstruction Model

The computer system can also implement an image reconstruction model configured to reassemble a set of tiles extracted from a commissioning image, by each sensor block, into a floorplan of the region-of-interest associated with the commissioning image.

In one implementation, the computer system can implement regression, machine learning, edge detection techniques, and other computer vision techniques to develop (or "learn") an image reconstruction model for a particular region-of-interest based on tile characteristics—such as a dimension (e.g., a size), RGB color components, (x,y) pixel locations, image resolution, and time of day—extracted from an initial commissioning image captured by a sensor block during the setup period.

For example, the sensor block can implement methods and techniques described above to: capture an initial commissioning image depicting a region-of-interest at the optical sensor arranged in the sensor block; transform the initial commissioning image into a population of tiles; and transmit the population of tiles to the computer system for reconstruction of a floorplan of the region-of-interest depicted in the initial commissioning image. The computer system can then: receive the population of tiles, each tile in the population of tiles depicting a subregion of the region-of-interest; access a corpus of tile characteristics including a dimension of each tile, RGB color components of each tile, (x,y) pixel locations for each tile, image resolution of each tile, and time of day of capture of the initial commissioning image; access the existing digital floorplan and/or furniture layout of the space defining furniture object types and a set of immutable objects—such as a set of walls, a door, a floor, or a ceiling—for each region-of-interest within the space; and generate an image reconstruction model linking the population of tiles with corresponding immutable objects and furniture object types based on the corpus of tile characteristics and the existing digital floorplan and/or furniture layout of the space. The computer system can therefore leverage this image reconstruction model to reassemble a set of tiles into a floorplan for similar regions-of-interest depicted in future commissioning images captured by each sensor block deployed throughout the space.

Alternatively, the computer system can: detect a common pattern of tile characteristics corresponding to furniture object types and immutable objects for the population of tiles; track the common pattern of tile characteristics corresponding to these furniture object types and immutable objects for each other population of tiles extracted by the population of sensor blocks; and generate the image reconstruction model based on these common patterns of tile characteristics.

Additionally, the computer system can derive an image reconstruction model for a particular region-of-interest (e.g., an agile work environment, a conference room, a lounge, a cafeteria, a reception area), a particular furniture object type (e.g., a chair, a table, a desk, a couch), a particular tile size (e.g., 10 by 10), and/or a particular time of day (e.g., an agile work environment before working hours or after working hours). Alternatively, the computer system can derive a global image reconstruction model configured to reassemble populations of tiles into a floorplan of all regions-of-interest for the space.

12.3 Floorplan Reconstruction+Object Type Priority

In one variation, the computer system can receive the set of tiles from each sensor block in the population of sensor blocks deployed throughout the facility and access the database of annotated commissioning images. The computer system can then leverage the image reconstruction model, the set of tiles, and boundaries extracted from the database of annotated commissioning images to reconstruct a set of vectorized commissioning images. The computer system can then initialize a vectorized visualization layer within the space and implement methods and techniques described below to generate heatmaps representing furniture object types of each region-of-interest within the space.

For example, each sensor block in the population of sensor blocks can: capture a commissioning image depicting the region-of-interest at the optical sensor; extract a set of tiles from the image, each tile in the first set of tiles depicting a subregion of the region-of-interest; access a specification of region-of-interest partitions annotated with boundaries, identifiers, and a time window for tile transmission; and, in response to the setup period intersecting the time window for tile transmission, transmit the set of tiles to the computer system. The computer system can then access the database of commissioning images annotated with region-of-interest partitions and corresponding boundaries captured by the set of sensor blocks; reconstruct a set of vectorized commissioning images captured by the set of sensor blocks based on the set of tiles and the image reconstruction model in Block S132; and initialize a composite visualization layer of the space based on the set of vectorized commissioning images in Block S150.

In another variation, in order for the computer system to reconstruct a floorplan of the region-of-interest, the sensor block can: discard tiles depicting a human; access a particular object type as a priority (e.g., a chair object type, a desk object type, a table object type); and transmit the remaining tiles, prioritizing the particular object type.

In one example, during the setup period, the sensor block: accesses a priority of a chair object type defined at the computer system; detects a set of chairs depicted in a second subset of tiles, in the set of tiles; and transmits the second subset of tiles to the computer system. The computer system then assembles the second subset of tiles into the sparse image map of the first region-of-interest. The computer system implements methods and techniques described above to calculate the frequency of presence of the chair object type, in the set of object types, intersecting the pixel over the first time period based on the first set of containers; and generates a heatmap representing locations of the chair object type, in the set of object types, within the first region-of-interest based on the first visualization layer and the commissioning image.

In another example, during the setup period the sensor block: accesses a priority of a desk object type defined at the computer system; detects a set of desks depicted in a second subset of tiles, in the set of tiles; and transmits the second subset of tiles to the computer system. The computer system then assembles the second subset of tiles into the sparse image map of the first region-of-interest. The computer system implements methods and techniques described above to calculate the frequency of presence of the desk object type, in the set of object types, intersecting the pixel over the first time period based on the first set of containers; and generates a heatmap representing locations of the desk object type, in the set of object types, within the first region-of-interest based on the first visualization layer and the commissioning image.

Therefore, the computer system can leverage an object type priority and the image reconstruction model to reassemble tiles, depicting the object type priority, into a floorplan of a region-of-interest and/or into a vectorized visualization of all region-of-interests within the space.

12.4 Vectorized Visualization+Heatmap

The computer system can then execute Blocks of the method S100 to: initialize a visualization layer of a region-of-interest; calculate a frequency of presence of each object type intersecting each pixel in the visualization layer; calculate a color value for each pixel based on the frequency of presence; and assign the color value to each pixel in the visualization layer. The computer system can then implement methods and techniques described above to project the visualization layer onto the commissioning image of the region-of-interest—reassembled via the image reconstruction model and the set of tiles—to generate a heatmap of the region-of-interest.

Furthermore, the computer system can implement methods and techniques described above to detect deviations of object types (e.g., human object types, furniture object types) within a particular pixel between a set of heatmaps corresponding to different time periods. The computer system can further present these heatmaps—highlighted with the deviation and with no or minimal exposure of private employee (or "worker") information—to a user and thereby enable a user to timely review patterns of human object types interacting with furniture object types within a region-of-interest of the space.

Additionally or alternatively, the computer system can implement methods and techniques described above to project the visualization layer onto the vectorized floorplan of the space to generate a composite heatmap of all region-of-interests within the space. Further, the computer system can similarly present the composite heatmap of the space to a user and thereby enable the user to timely review patterns of object types for all regions-of-interest within the space.

13. Augmented Two-Dimensional Floor Plan and Three-Dimensional Map

Generally, the computer system is configured to aggregate data from sensor blocks deployed in the space, compile these data into locations of object types in the space, populate an augmented two-dimensional map of the space with graphical representations of these object types according to their locations and orientations, and present the augmented two-dimensional map to a user.

However, the computer system can additionally or alternatively implement similar method and techniques to manage an augmented three-dimensional map of the space. The computer system can populate the augmented three-dimensional map of the space with graphical representations of object types according to their locations and orientations and present the augmented three-dimensional map to a user.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for debugging images and tracking objects within a space, the method comprising:
   during a setup period, at a sensor block in a set of sensor blocks:
      capturing a first commissioning image depicting a first region-of-interest within the space by an optical sensor arranged in the sensor block;
      transforming the first commissioning image into a set of tiles, each tile in the set of tiles annotated with a tile location representing a subregion within the first region-of-interest;

detecting a set of humans depicted in a first subset of tiles in the set of tiles;
in response to detecting the first set of humans in the first subset of tiles, in the set of tiles, discarding the first subset of tiles; and
assembling a second subset of tiles, excluding the first subset of tiles, into a sparse image map of the first region-of-interest;
predicting a set of synthetic visual features within a set of empty subregions, corresponding to the first subset of tiles, in the sparse image map based on features detected in the second subset of tiles; and
generating a hybrid commissioning image, representing the first region-of-interest within the space, based on the second subset of tiles and the set of synthetic visual features.

2. The method of claim 1:
further comprising, during the setup period:
accessing a target complexity score for tiles; and
characterizing a complexity score of each tile in the second subset of tiles, based on features detected in the second subset of tiles; and
wherein predicting the set of synthetic visual features within the set of empty subregions, corresponding to the first subset of tiles, in the sparse image map comprises, in response to the complexity score of the second subset of tiles exceeding the target complexity score, predicting the set of synthetic visual features within the set of empty subregions, corresponding to the first subset of tiles, in the sparse image map based on features detected in the second subset of tiles.

3. The method of claim 1:
further comprising, during the setup period at the sensor block, transmitting the second subset of tiles, excluding the first subset of tiles, to a computer system;
wherein assembling the second subset of tiles, excluding the first subset of tiles, into the sparse image map of the first region-of-interest comprises at the computer system, assembling the second subset of tiles, excluding the first subset of tiles, into the sparse image map of the first region-of-interest;
wherein predicting the set of synthetic visual features within a set of empty subregions, corresponding to the first subset of tiles, in the sparse image map comprises at the computer system, predicting the set of synthetic visual features within the set of empty subregions, corresponding to the first subset of tiles, in the sparse image map based on features detected in the second subset of tiles; and
wherein generating the hybrid commissioning image comprises at the computer system, generating the hybrid commissioning image, representing the first region-of-interest within the space, based on the second subset of tiles and the set of synthetic visual features.

4. The method of claim 3:
further comprising, during the setup period at the sensor block:
accessing a specification defining the first region-of-interest annotated with the boundary and a time window for tile transmission based on an identifier associated with the sensor block; and
calculating a quantity of the second subset of tiles extracted from the first commissioning image; and
wherein transmitting the second subset of tiles, excluding the first subset of tiles, to the computer system comprises, in response to the quantity of the second subset of tiles exceeding a threshold quantity of tiles and in response to the setup period intersecting the time window for tile transmission, transmitting the second subset of tiles, excluding the first subset of tiles, to the computer system.

5. The method of claim 1:
further comprising, during the setup period at the sensor block:
accessing a specification defining the first region-of-interest annotated with a time window for tile transmission based on an identifier associated with the sensor block; and
in response to the setup period intersecting the time window for tile transmission, transmitting the second subset of tiles and the boundary to a computer system; and
wherein generating the hybrid commissioning image comprises at the computer system, generating the hybrid commissioning image, representing the first region-of-interest within the space, based on the second subset of tiles and the set of synthetic visual features.

6. The method of claim 1, further comprising:
during an initial time period preceding the setup period, at the sensor block:
capturing an initial commissioning image by the optical sensor;
storing the initial commissioning image in a database of commissioning images;
generating a prompt for a user to define a boundary for the first region-of-interest, representing a predicted occupancy region of the space, on the initial commissioning image; and
in response to receiving the boundary for the initial commissioning image, representing the boundary as a region-of-interest partition within a coordinate system aligned with a field of view of the optical sensor; and
wherein capturing the first commissioning image depicting the first region-of-interest within the space comprises, in response to the first region of interest corresponding to the region-of-interest partition aligned with the field of view of the optical sensor, capturing the first commissioning image depicting the first region-of-interest within the space by the optical sensor.

7. The method of claim 1:
further comprising, during the setup period, at the sensor block:
detecting a set of features within the first region-of-interest in the first commissioning image;
detecting an initial set of objects within the first region-of-interest based on the set of features;
for each object in the initial set of objects:
identifying an initial furniture object type, in a set of furniture object types, of the object based on a subset of features in the set of features; and
extracting an initial location of the object within the first region-of-interest from the first commissioning image based on positions of the subset of features; and
storing furniture object types and locations of the initial set of objects, detected in the first commissioning image in an initial set of containers; and
wherein assembling the second subset of tiles into the sparse image map comprises assembling the second subset of tiles, furniture object types, and locations of the initial set of objects into the sparse image map representing a floorplan of the first region-of-interest based on the initial set of containers.

8. The method of claim 7:
wherein detecting the set of objects in the first commissioning image comprises detecting the set of objects within the first region-of-interest comprising a reception area in the first commissioning image; and
wherein assembling the second subset of tiles, furniture object types, and locations of the set of objects into the sparse image map comprises assembling the second subset of tiles, furniture object types, and locations of the set of objects into the sparse image map representing the floorplan of the reception area based on the initial set of containers.

9. The method of claim 1:
wherein assembling the second subset of tiles, excluding the first subset of tiles, into the sparse image map comprises assembling the second subset of tiles, excluding the first subset of tiles, into a vectorized map of the first region-of-interest; and
wherein predicting the set of synthetic visual features within the set of empty subregions, corresponding to the first subset of tiles, in the sparse image map comprises predicting the set of synthetic visual features within the set of empty subregions, corresponding to the first subset of tiles, in the vectorized map based on features detected in the second subset of tiles.

10. The method of claim 1, further comprising:
during a first time period, at the sensor block, in the set of sensor blocks:
  capturing a first sequence of frames by the optical sensor arranged in the sensor block;
  for each frame in the first sequence of frames:
    detecting a first set of objects within the first region-of-interest in the frame; and
    for each object in the first set of objects:
      identifying an object type, in a set of object types, of the object; and
      extracting a location of the object within the first region-of-interest in the frame;
  storing object types and object locations of the first set of objects, detected in the first sequence of frames, in a first set of containers; and
  transmitting the first set of containers to a computer system; and
at the computer system:
  receiving a boundary for the first region-of-interest, representing a predicted occupancy region of the space;
  annotating the hybrid commissioning image with the boundary representing the predicted occupancy region of the space;
  calculating a frequency of presence of a first object type, in the set of object types, intersecting the boundary of the first region-of-interest over the first time period based on the set of containers;
  calculating a color value for the first object type, in the set of object types, based on the frequency of presence;
  populating a set of subregions of the hybrid commissioning image corresponding to locations of objects detected as the first object type, in the set of object types, with the color value; and
  generating a heatmap of the first region-of-interest for the first time period based on the hybrid commissioning image.

11. The method of claim 10:
further comprising, at the computer system, initializing a first visualization layer representing the first region-of-interest;
wherein calculating the frequency of presence of the first object type, in the set of object types, intersecting the boundary of the first region-of-interest comprises, for each pixel in a set of pixels in the first visualization layer:
  calculating a frequency of presence of the first object type intersecting each pixel over the first time period based on the first set of containers;
wherein calculating the color value for the first object type comprises, for each pixel in the set of pixels in the first visualization layer:
  calculating the color value for the pixel based on the frequency of presence;
wherein populating the set of subregions of the hybrid commissioning image comprises, for each pixel in the set of pixels in the first visualization layer:
  assigning the color value to the pixel in the first visualization layer; and
wherein generating the heatmap of the first region-of-interest comprises generating the heatmap of the first region-of-interest for the first time period based on the first visualization layer and the hybrid commissioning image.

12. The method of claim 10:
further comprising, during the setup period at the first sensor block:
  accessing a priority of a chair object type defined at the computer system; and
  detecting a set of chairs depicted in a third subset of tiles, in the set of tiles;
wherein assembling the second subset of tiles, excluding the first subset of tiles, into the sparse image map comprises assembling the third subset of tiles into the sparse image map of the first region-of-interest;
wherein calculating the frequency of presence of the first object type, in the set of object types, intersecting the boundary of the first region-of-interest comprises calculating the chair object type, in the set of object types, intersecting the boundary of the first region-of-interest over the first time period based on the first set of containers; and
wherein generating the heatmap of the first region-of-interest comprises generating the heatmap representing locations of the chair object type, in the set of object types, within the first region-of-interest based on the hybrid commissioning image.

13. The method of claim 10:
further comprising, at the first sensor block during the setup period:
  accessing a priority of a table object type defined at the computer system; and
  detecting a set of tables depicted in a third subset of tiles, in the set of tiles;
wherein assembling the second set of tiles, excluding the first subset of tiles, into the sparse image map comprises assembling the third subset of tiles into the sparse image map of the first region-of-interest;
wherein calculating the frequency of presence of the first object type, in the set of object types, intersecting the boundary of the first region-of-interest comprises calculating the frequency of presence of the table object type, in the set of object types, intersecting the boundary of the first region-of-interest over the first time period based on the first set of containers; and wherein generating the heatmap of the first region-of-interest comprises generating the heatmap representing locations of the table object type, in the set of object types, within the first region-of-interest based on the hybrid commissioning image.

14. The method of claim 10:
wherein calculating the color value for the first object type, in the set of object types, comprises:
assigning a color range to the first object type intersecting the boundary of the first region-of-interest; and
in response to the frequency of presence exceeding a threshold frequency, calculating the color value comprising a color intensity for the first object type; and
wherein populating the set of subregions of the hybrid commissioning image corresponding to locations of objects detected as the first object type, in the set of object types, with the color value comprises populating the set of subregions of the hybrid commissioning image corresponding to locations of objects detected as the first object type, in the set of object types, with the color value and the color intensity.

15. The method of claim 10:
further comprising, at the computer system, storing the first commissioning image in a database of commissioning images annotated with region-of-interest partitions and corresponding boundaries captured by the set of sensor blocks; and
wherein generating the heatmap of the first region-of-interest comprises generating a composite heatmap of the space representing object usage patterns of object types for the first time period based on the database of commissioning images and the hybrid commissioning image.

16. A method for debugging images and tracking objects within a space, the method comprising:
during a setup period, at a sensor block, in a set of sensor blocks:
capturing a first commissioning image depicting a first region-of-interest within the space by an optical sensor arranged in the sensor block;
detecting a set of objects in the first commissioning image;
for each object in the set of objects:
detecting a furniture object type, in a set of furniture object types, of the object; and
detecting a location of the object within the first region-of-interest;
storing furniture object types and locations of the set of objects, detected in the first commissioning image in a set of containers;
transforming the first commissioning image into a set of tiles, each tile in the set of tiles annotated with a tile location representing a subregion within the first region-of-interest; and
transmitting the set of tiles and the set of containers to a computer system; and
at the computer system:
assembling the set of tiles, furniture object types, and locations of the set of objects into a sparse image map representing a floorplan of the first region-of-interest based on the set of containers; and
generating a hybrid commissioning image, representing the first region-of-interest within the space, based on the set of tiles and the sparse image map.

17. The method of claim 16:
further comprising, during the setup period at the sensor block:
detecting a set of humans depicted in a first subset of tiles, in the set of tiles; and
in response to detecting the first set of humans in the first subset of tiles, in the set of tiles, discarding the first subset of tiles from memory; and
wherein transmitting the set of tiles and the set of containers to the computer system comprises transmitting the set of tiles, excluding the first subset of tiles, and the set of containers to the computer system.

18. The method of claim 16:
wherein detecting the set of objects in the first commissioning image comprises detecting the set of objects within the first region-of-interest comprising an agile work environment in the first commissioning image;
wherein assembling the set of tiles, furniture object types, and locations of the set of objects into the sparse image map comprises assembling the set of tiles, furniture object types, and locations of the set of objects into the sparse image map representing the floorplan of the agile work environment based on the set of containers; and
wherein generating the hybrid commissioning image comprises generating the hybrid commissioning image, representing the agile work environment within the space, based on the set of tiles and the sparse image map.

19. A method for debugging images and tracking objects within a space, the method comprising:
during a setup period, at a sensor block, in a set of sensor blocks:
accessing a specification defining a first region-of-interest annotated with a boundary and a time window for tile transmission based on an identifier associated with the sensor block;
capturing a first commissioning image depicting the first region-of-interest within the space by an optical sensor arranged in the sensor block;
transforming the first commissioning image into a set of tiles, each tile in the set of tiles annotated with a tile location representing a subregion within the first region-of-interest;
detecting a set of humans depicted in a first subset of tiles, in the set of tiles;
in response to detecting the first set of humans in the first subset of tiles, in the set of tiles, discarding the first subset of tiles from memory; and
in response to the setup period intersecting the time window for tile transmission, transmitting a second subset of tiles, excluding the first subset of tiles, to a computer system; and
at the computer system:
assembling the second subset of tiles, excluding the first subset of tiles, into a sparse image map of the first region-of-interest;
predicting a set of synthetic visual features within a set of empty subregions, corresponding to the first subset of tiles, in the sparse image map based on features detected in the second subset of tiles; and
generating a hybrid commissioning image, representing the first region-of-interest within the space, based on the second subset of tiles and the set of synthetic visual features.

20. The method of claim 19:
further comprising, during the setup period, at the sensor block, calculating a quantity of the second subset of tiles extracted from the first commissioning image; and
wherein transmitting the second subset of tiles, excluding the first subset of tiles, to the computer system comprises, in response to the quantity of the second subset of tiles exceeding a threshold quantity of tiles and in response to the setup period intersecting the time window for tile transmission, transmitting the second subset of tiles to the computer system.

* * * * *